United States Patent
Chatelin et al.

Patent Number: 5,281,239
Date of Patent: Jan. 25, 1994

[54] PROCESS FOR IMPARTING FLAME RETARDANCY TO TEXTILE MATERIALS

[75] Inventors: Roger Chatelin, Bois Dieu; Louis Gavet, Lyons, both of France

[73] Assignee: Centre technique industriel dit: Institut Textile de France, France

[21] Appl. No.: 921,015

[22] Filed: Jul. 28, 1992

[30] Foreign Application Priority Data

Aug. 5, 1991 [FR] France .................. 91 10247

[51] Int. Cl.$^5$ .......................... D06M 11/00
[52] U.S. Cl. ...................... 8/128.1; 427/389; 427/393.3; 428/921
[58] Field of Search ............ 8/128.1; 427/393.3, 427/389; 428/921

[56] References Cited

U.S. PATENT DOCUMENTS 3,817,779  6/1974  Golborn .......................... 117/136
4,681,634  7/1987  Roca et al. ...................... 106/823 X

OTHER PUBLICATIONS

Ban, "Finishing of Silk", 1977, Chemical Abstracts, vol. 87, p. 73, Abstract No. 69694t.

*Primary Examiner*—Michael Lusignan
*Attorney, Agent, or Firm*—Ladas & Parry

[57] ABSTRACT

According to the invention, the treatment process for imparting flame retardancy consists in grafting a textile material containing nitrogen atoms in its polymeric structure, especially silk, with a phosphoric acid ethyenic ester of the general formula

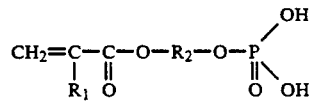

in which $R_1$ is selected from the group comprising H and alkyls and $R_2$ is selected from the group comprising alkylenes and alkylene oxides and/or polyalkylene oxides, for example phosphated ethylene glycol methacrylate, the grafting rate being less than or equal to 20%.

12 Claims, No Drawings

PROCESS FOR IMPARTING FLAME RETARDANCY TO TEXTILE MATERIALS

The present invention relates to the flameproofing of textile materials, especially silk articles intended for furnishing. It relates more particularly to a process for rendering these materials non-flammable, in accordance with the Standards in force, by applying the grafting technique.

A large number of treatments exist for imparting flame retardancy to textile articles. In general the treatment consists in depositing a flame retardant finish, containing nitrogen, phosphorus or chlorine atoms, on the surface of the article; the presence of this finish alters the feel of the article. Another type of treatment consist in modifying the article chemically on the surface, in particular to create complexes based on zirconium or tantalum; this treatment alters the characteristics of the article and is capable in particular of rendering it brittle.

The object which the Applicant set out to achieve is to propose a flame retardancy treatment which overcomes the above-mentioned disadvantages in that it does not substantially alter either the feel or the characteristics of the article treated.

This object is perfectly achieved by the process of the invention. This is a treatment process for imparting flame retardancy to a textile material containing nitrogen atoms in its polymeric structure, said process consisting in grafting said material with a phosphoric acid ethylenic ester of the general formula

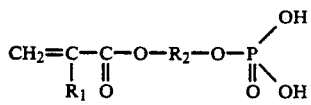

in which $R_1$ is selected from the group comprising H and alkyls and $R_2$ is selected from the group comprising alkylenes and alkylene oxides and/or polyalkylene oxides, the grafting rate being less than or equal to 20%.

The combined presence of the nitrogen atoms in the textile material and the phosphorus atoms in the grafting agent makes it possible to provide the grafted material with the desired flame retardancy properties, the grafting rate being sufficiently low for there to be substantially no degradation of either the feel or the characteristics of the material.

The preferred textile material of the invention is silk, which contains a large number of amino acids in its macromolecular structure and is therefore very rich in nitrogen atoms.

The classification Ml according to French Standard NF P 92.503 was obtained with a grafting rate of at least 5%.

The preferred phosphoric acid ethylenic ester is the ethylene methacrylate of the above-mentioned general formula in which $R_1$ is H and $R_2$ is ($CH_2$—$CH_2$).

In the case of silk, the grafting is preferably carried out by immersing the textile material in an aqueous solution containing the phosphoric acid ethylenic ester and a grafting initiator.

An example of the grafting initiator used is ammonium persulfate at a concentration of about 0.1% by weight in the aqueous grafting solution.

If the bath ratio is short, i.e. of the order of 1/30, the concentration of phosphoric acid ethylenic ester in the aqueous solution is at least of the order of 1% by weight. It is under these conditions that a grafting rate of the order of 5% is obtained, making it possible to obtain the flame retardancy classification M1. However, if the bath ratio is long, i.e. more than 1/100, it has been observed that, under normal conditions resulting in a high grafting rate close to 20%, the grafted material does not satisfy the requisite criteria for the classification M1.

It has been possible to correct this unexpected negative result by imposing a further constraint on the process, namely the need to add pure phosphoric acid to the aqueous grafting solution.

For example, for a bath ratio of 1/200 and a phosphoric acid ethylenic ester concentration of 1%, 0.25% by weight of pure phosphoric acid was added. The material was grafted at a rate of 17% and the flame retardancy classification was M1.

One may attempt to explain this phenomenon by suggesting that hydrolysis of the phosphoric acid ethylenic ester takes place, particularly when the bath ratio is long, resulting in the cleavage of phosphoric acid and the formation of an alcohol. Thus, although the grafting reaction does occur, the hydrolyzed grafting agent no longer contains the phosphorus atom essential for obtaining the flame retardancy properties. The addition of phosphoric acid to the grafting solution makes it possible to restrict this hydrolysis reaction.

The present invention will be understood more clearly with the aid of the following description of several Examples of the flame retardancy treatment of silk by grafting with a phosphoric acid ethylenic ester.

The phosphoric acid ethylenic ester used for all the Examples described is phosphated ethylene glycol methacrylate of the formula

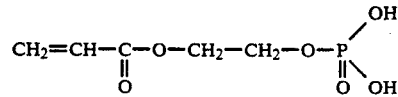

referred to hereafter as PEGMA.

EXAMPLE 1

A silk fabric is grafted in a glass tube in the laboratory. The aqueous grafting solution contains 0.1% by weight of ammonium persulfate as initiator. The bath ratio is 1/30. The residence time of the sample in the solution is 2 hours, the solution being heated to 90° C.

Table 1 below gives the values of the grafting rate (A) as a function of the concentrations (C) by weight of PEGMA in the grafting solution. The grafting rate Rg (A) is equal to $$Rg = \frac{W_1 - W_0}{W_1}$$

in which $W_1$ is the weight of the grafted material and $W_0$ is its weight before grafting.

| C (%) | 3 | 2.5 | 2 | 1.5 | 1 |
|---|---|---|---|---|---|
| A (%) | 12.4 | 11.0 | 10.2 | 9.8 | 6.9 |

All the samples of grafted silk were subjected to flame retardancy tests according to French Standard NF P 92.503, corresponding to a ministerial decree of June 1983 for establishments which receive the public and for tall furniture. This test is aimed more particularly at textile materials intended for furnishing.

All the samples referred to above received the classification M1, which is the best possible classification, Standard NF P 92.503 providing for classifications M1 to M4.

By way of comparison, a sample which had been grafted at a rate of less than 5% under the same operating conditions was given an inferior flame retardancy classification.

EXAMPLE 2

All the operating conditions of the first Example are retained with the exception of the bath ratio.

Table 2 below gives the values of the grafting rate (A) as a function of the value (R) of the bath ratio.

| R | 1/30 | 1/40 | 1/50 | 1/60 | 1/70 |
|---|---|---|---|---|---|
| A (%) | 12 | 13.5 | 15.3 | 16.2 | 18.5 |

The same flame retardancy tests were performed and all the samples received the classification M1.

EXAMPLE 3

A silk fabric is grafted, on samples weighing 150 g, in a stainless steel dyeing apparatus known by the name MINILAB.

The operating conditions are retained: duration 2 hours, temperature of the grafting solution 90° C., ammonium persulfate concentration 0.1%.

The bath ratio is 1/200.

The aqueous grafting solution contains, in addition to the initiator, 1% by weight of PEGMA and 0.25% by weight of pure phosphoric acid.

The grafted sample is rinsed first in hot water at 60° C. and then in cold water at 15° C.

The grafting rate is found to be 17%.

The classification obtained in the flame retardancy tests according to Standard NF P 92.503 is M1.

Samples grafted under the above conditions were subjected to five successive washes. The flame retardancy classification M1 is maintained. The same applies after cleaning.

By way of comparison, a sample grafted under conditions strictly identical to those of the present Example, but with a grafting solution not containing phosphoric acid, had an equivalent grafting rate but did not obtain the classification M1.

The present invention is not limited to the practical Examples described above.

In particular, the process of the invention applies to any textile materials which contain, in their polymeric structure, a sufficient number of nitrogen atoms such that, when combined with the phosphorus atoms in the grafting agent, the desired flame retardancy properties are obtained. This obviously applies to silk, but also applies to other materials, for example wool, whose keratin structure contains amino acids and is therefore rich in nitrogen atoms.

What is claimed is:

1. A treatment process for imparting flame retardancy to a textile material containing nitrogen atoms in its polymeric structure, which consists in grafting said material with a phosphoric acid ethylenic ester of the general formula

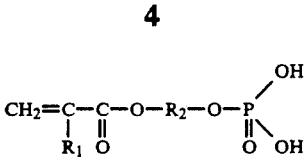

in which $R_1$ is selected from the group consisting of H and alkyls and $R_2$ is selected from the group consisting of alkylenes, alkylene oxides and polyalkylene oxides, the grafting rate being less than or equal to 20%.

2. A process according to claim 1, wherein said phosphoric acid ethylenic ester is phosphated ethylene glycol methacrylate, PEGMA, of the formula

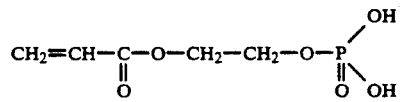

3. A treatment process for imparting flame retardancy to a textile material containing nitrogen atoms in its polymeric structure, which consists in grafting said material with a phosphoric acid ethylenic ester of the general formula

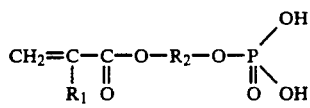

in which $R_1$ is selected from the group consisting of H and alkyls and $R_2$ is selected from the group consisting of alkylenes, alkylene oxides or polyalkylene oxides, the grafting rate being less than or equal to 20%.

4. A process according to claim 3, wherein said phosphoric acid ethylenic ester is phosphated ethylene glycol methacrylate, PEGMA, of the formula

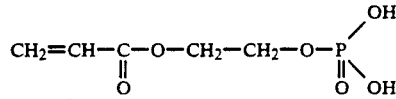

5. A process according to claim 1 or claim 3 wherein the textile material is silk.

6. A process according to claim 5 wherein the grafting rate is greater than 5%, in return for which the grafted silk has the classification M1 according to Standard NF P 92.503.

7. A process according to claim 5 wherein the grafting is carried out by immersing the silk in an aqueous solution containing the phosphoric acid ethylenic ester and a grafting initiator.

8. A process according to claim 7 wherein the grafting initiator is ammonium persulfate at a concentration of about 0.1% by weight in the aqueous grafting solution.

9. A process according to claim 5 wherein, with the grafting being carried out using a short bath ratio, the concentration of phosphoric acid ethylenic ester in the aqueous solution is at least 1% by weight.

10. A process according to claim 5 wherein, with the grafting being carried out using a bath ratio of more than 1/100, the aqueous grafting solution also contains pure phosphoric acid.

11. A process according to claim 10 wherein the grafting is carried out under the following conditions:
 a. aqueous solution containing 1% by weight of PEGMA, 0.25% by weight of pure phosphoric acid, 0.1% of ammonium persulfate,
 b. bath ration 1/200,
 c. temperature of the solution 90° C.,
 d. duration 2 hours.

12. A process according to claim 2 or claim 4 wherein the textile material is silk.

* * * * *